June 13, 1933.  H. W. HUKING  1,913,672
INTERNALLY LIGHTED WIND CONE
Filed April 4, 1930
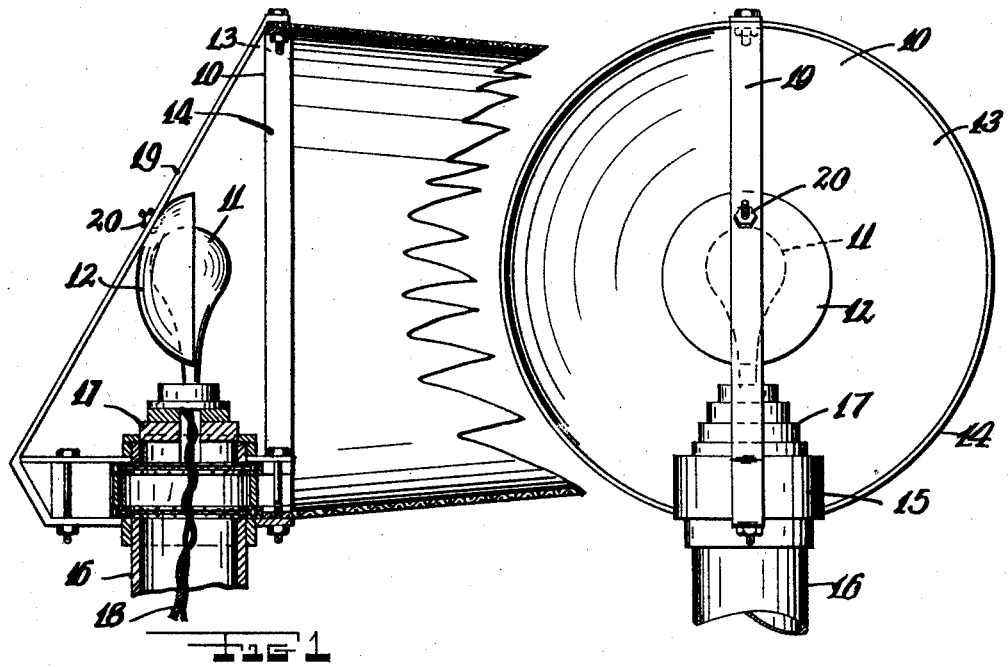
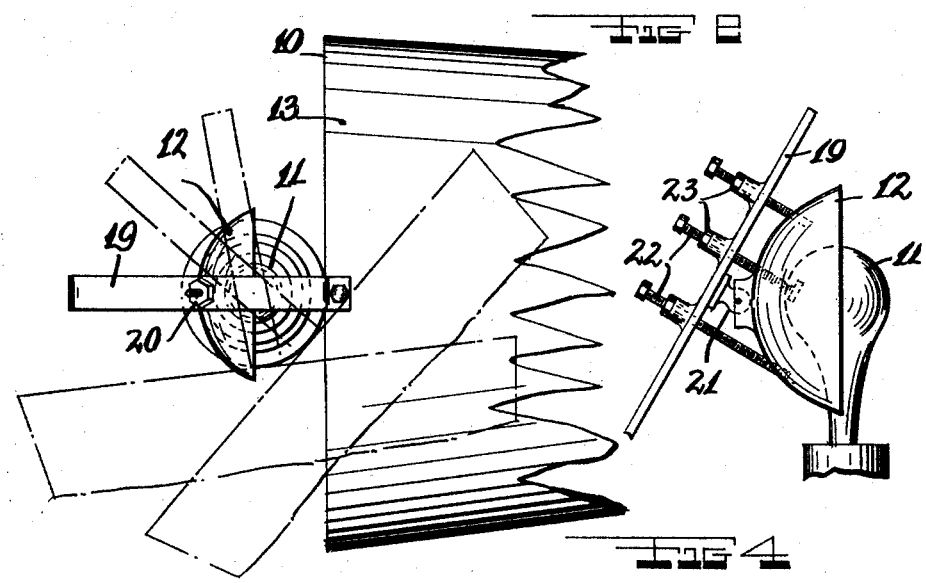
INVENTOR.
Harry W. Huking
BY Zoltan Holacheck
ATTORNEY Patented June 13, 1933

1,913,672

UNITED STATES PATENT OFFICE

HARRY W. HUKING, OF RENO, NEVADA

INTERNALLY LIGHTED WIND CONE

Application filed April 4, 1930. Serial No. 441,466.

This invention relates to new and useful improvements in a wind sock, and has more particular reference to an illuminated wind sock.

The invention has for an object the provision of a device of the class mentioned which is of simple durable construction, dependable in use and efficient in action, and which can be manufactured and sold at a reasonable cost.

Wind socks are used on all aviation fields for the purpose of indicating the wind direction and its velocity. The wind sock is one of the most important pieces of aviation field equipment in that it aids a flyer materially. It is conventional to shine lights on wind socks on aviation fields so as to illuminate them to be viewable by pilots during flight. It is customary to flood the entire area in the vicinity of the sock with beams of light and for this reason the sock itself can only be seen from a short distance. If the pilot is at a greater distance than the one just mentioned, he merely sees an illuminated area and cannot make out the sock.

The invention proposes to illuminate the sock itself and no other objects in the vicinity of the sock. Then, because the light is contained entirely on the sock only, it is plainly visible from a much greater distance than when flooded in the vicinity of the sock.

The invention further proposes a wind sock supported for rotating about a vertical axis, a stationary lamp supported on said axis for shining within the interior of the wind sock, and a reflector supported from said wind sock for rotating around said lamp and reflecting rays from the lamp within the sock for intensely illuminating it in all positions of rotation.

It is another object of this invention to provide a means for adjustably supporting the reflector so that its direction of reflection may be changed for obtaining the most efficient operation.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a device constructed according to this invention.

Fig. 2 is an end elevational view seen looking from the left in Fig. 1.

Fig. 3 is a plan view of Fig. 1.

Fig. 4 is a fragmentary view of a portion of Fig. 1 illustrating a modification.

The illuminated wind sock consists of a wind sock 10 supported for rotating about a vertical axis, a stationary lamp 11 supported on said axis for shining within the interior of the sock, and a reflector 12 supported from said wind sock for rotating around said lamp and reflecting rays from the lamp within the sock for intensely illuminating it in all positions of rotation.

Conventional wind socks are made from fabric material. Such socks may be used in this invention or any other which are translucent so as to glow when the interior is illuminated. The one shown on the drawing is of substantially cone shape and is arranged in a horizontal position. It is of hollow construction and opened at the large end 13. A ring 14 is attached upon the large opened end 13 and is rigidly supported upon one side of the outer race of a ball bearing 15 whose inner race is supported upon the top of a vertical post 16. The post may be supported at the bottom in any manner.

The vertical axis about which the wind sock 10 moves coincides with the axis of the post 16. A lamp socket 17 is attached upon the top of the post 16 and holds the said lamp 11. Wires 18 from this socket pass thru the post and are intended for connection in a circuit including a switch and a source of power. The lamp 11 should be positioned approximately at the axis of the ring 14 so that its light may shine within the sock 10.

The reflector 12 may be of any type, but preferably it should be parabolic. It is shown positioned so that the lamp 11 is between it and the sock 10. The means for supporting the reflector for rotating around said lamp and reflecting rays from the lamp into the socket consists of a strap 19 attached at its top upon the top of the ring 14 and inclined downwards and outwards, and attached at its bottom upon the outer race of the ball bearing 15. The point of attachment is directly opposite the point of attachment of the ring 14 upon the race. A bolt 20 is used for connecting the reflector with the strap 19.

In the modified form of the device illustrated in Fig. 4, a means has been shown for adjustably supporting the reflector 12. This means consists of a universal joint 21 connecting the reflector 12 with the strap 19. Several screws 22 threadedly engage thru the strap 19 and are abuttable against the rear of the reflector 12 so as to hold it in stationary positions. Lock nuts 23 are arranged upon the screws 22. The tilt of the reflector may be changed by loosening the screws first and then turning the screws outwards so that they engage against the rear of the reflector and hold it against motion.

When a current of air blows, it engages within the sock 10 and causes the sock to rotate so as to point in the direction towards which the wind blows. The sock follows the wind as the wind changes, since it is free to rotate upon the axis of the post 16. The lamp 11 at all times shines within the sock irrespective of the position of rotation of the sock. The reflector 12 follows the sock and maintains its position so that at all times the lamp 11 is between it and the sock. It thus reflects and concentrates the rays from the lamp into the interior of the sock. The highly concentrated rays are visible from the exterior of the sock and it appears as though the sock is glowing.

Aeroplanes during flight clearly can see the glowing sock. As it changes its position, its view is not hindered in any fashion since other objects in its vicinity remain dark and only the sock is illuminated. The illuminated sock against a dark background is vividly noticeable.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An illuminated wind sock, comprising a vertical post, a member rotatively supported on said post, a vertical ring carried by said member for rotation about the axis of said post, a translucent wind sock supported on said vertical ring, a strip connected at one end to the top of the ring and at its other end to said member, a lamp supported on said post substantially at the axis of said vertical ring, and a reflector supported on the strip so that the lamp is disposed between the reflector and said ring.

2. An illuminated wind sock, comprising a member rotatively supported for turning on a vertical axis, a vertical ring carried by said member for rotation about said vertical axis, a translucent wind sock supported on said vertical ring, a lamp fixedly supported substantially at the axis of rotation of said vertical ring, and means for always reflecting the rays of said lamp into said sock.

3. An illuminated wind sock, comprising a translucent wind sock rotatively supported for turning on a vertical axis, a lamp fixedly supported substantially at the axis of rotation of said wind sock, and means for always reflecting the rays of the lamp into said sock.

4. An illuminated wind sock, comprising a translucent wind sock rotatively supported for turning on a vertical axis, a lamp fixedly supported substantially at the axis of rotation of said wind sock, and means for always reflecting the rays of the lamp into said sock, comprising a reflector mounted upon the rotative support of the wind sock so that the lamp is always disposed between the reflector and the wind sock.

In testimony whereof I have affixed my signature.

HARRY W. HUKING.